United States Patent [19]

Reznik

[11] 4,339,867

[45] Jul. 20, 1982

[54] METHOD FOR FIXTURING WORKPIECES FOR HEAT EFFECTED JOINING OF SAME

[76] Inventor: Barry D. Reznik, 2224 E. 59th Pl., Brooklyn, N.Y. 11234

[21] Appl. No.: 106,888

[22] Filed: Dec. 27, 1979

[51] Int. Cl.³ .................... B23Q 7/00; B23P 17/00; B27F 7/02; B23K 9/28
[52] U.S. Cl. .................................. 29/559; 29/423; 29/527.1; 228/106; 228/44.1 R; 228/212; 219/86.24; 219/158; 269/7
[58] Field of Search ........ 29/157.4, 157.3 C, 157.3 V, 29/418, 423, 527.2, 559, 527.1; 269/7; 228/106, 44.1 R, 212; 219/86.24, 86.21, 85 M, 104, 105, 158; 76/107 R

[56] References Cited

U.S. PATENT DOCUMENTS

| | | | |
|---|---|---|---|
| 2,356,447 | 8/1944 | Cline | 269/7 X |
| 2,406,401 | 8/1946 | Richardson | 76/107 R X |
| 2,406,742 | 9/1946 | Cooper, Jr. | 76/107 R |
| 2,466,562 | 4/1949 | Steinberger | 29/423 |
| 2,807,657 | 9/1957 | Jenkins et al. | 29/423 |
| 3,088,299 | 5/1963 | McMahon, Jr. et al. | 269/7 X |
| 3,993,524 | 11/1976 | Okada et al. | 29/423 |

*Primary Examiner*—Francis S. Husar
*Assistant Examiner*—V. K. Rising
*Attorney, Agent, or Firm*—Gerald Post

[57] ABSTRACT

A method for fixturing two or more workpieces in a desired positional relationship with respect to one another by utilizing a moldable and heat resistant work holding material to position and support the workpieces. The work holding material may subsequently be hardened to provide a permanent and reusable fixture.

10 Claims, 5 Drawing Figures

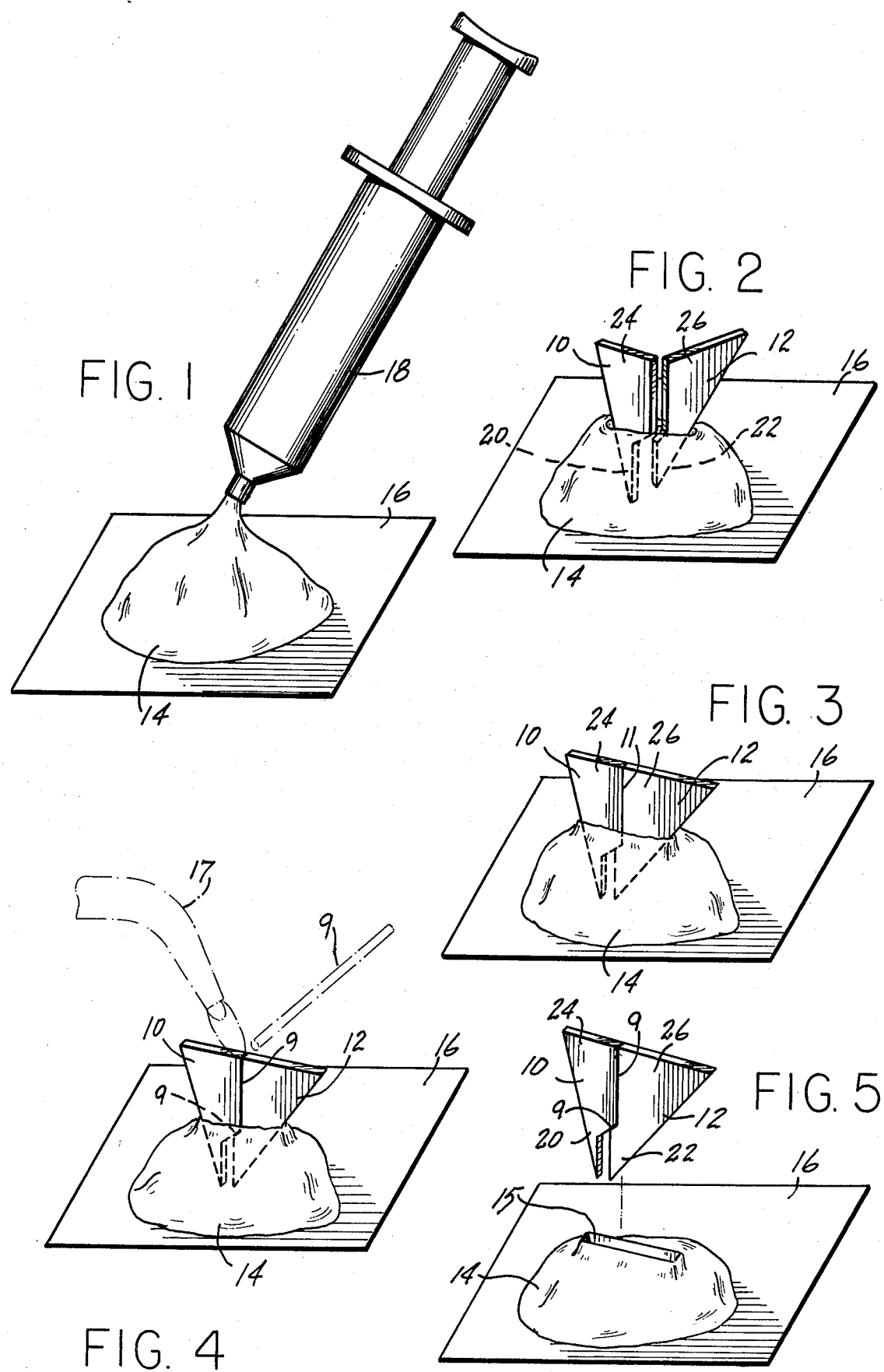

METHOD FOR FIXTURING WORKPIECES FOR HEAT EFFECTED JOINING OF SAME

BACKGROUND OF THE INVENTION

The present invention relates to fixtures for supporting workpieces for joining by well known methods of metal fusion such as soldering, brazing and welding.

Techniques of fixturing workpieces are well known in the prior art, but there is no known method that provides a universal fixturing material that is adaptable to support workpieces having a wide variation of goemetric configurations.

The function of the fixture is to securely support two or more workpieces in a desired positonal relationship to one another while effecting their joining. The fixture needs sufficient holding strength to retain the workpieces in accurate relationship without changing dimensionally under the application of heat.

In many industries including the manufacture of dental devices, jewelry and other such delicate assemblies, the fixture must conform to a variety of intricate shapes while effecting a firm grip on the parts. Many prior art fixtures attempt to meet there requirements by providing complicated and costly apparatuses comprising clamps, adjusting screws and other holding and locating members. Once built, these fixtures can serve for retaining only parts having the particular configuration for which they were designed. When differently shaped parts are to be fixtured, another apparatus must be designed and built.

Some prior art devices are shown in U.S. Pat. Nos. 3,110,279 to Brasher; 3,800,408 to Schimmer et al; and 3,897,535 to Lapac et al. The Brasher patent discloses a work positioner comprising a motor driven rotating platform designed to position the workpieces with respect to a welding torch. Schimmer et al describe a method for fixturing semiconductor components utilizing a machined polyimide jig comforming to the semiconductor. The patent to Lepac et al describes a process for fixturing a workpiece in a workholder by introducing a hardenable liquid thermoplastic into the holder after preheating both the workpiece and holder.

None of these devices has the universality of the present invention.

SUMMARY OF THE INVENTION

It is the principle object of the present invention to provide a method for fixturing workpieces having a multiplicity of geometric shapes without constructing individual fixtures for each.

A further object of the invention is to provide a fixture that is capable of accurately positioning each of these workpieces.

A still further object is to provide a reusable, low cost fixturing medium that will not react with metals.

A still further object is to provide a fixture that can be hardened for use as a permanent holding means when many pieces of the same shape are to be joined.

These and other objects are achieved by the method of the preferred embodiment of the invention in which a ceramic mixture is deposited on a work surface and the workpieces are partially inserted thereinto. After aligning the parts and manipulating the mixture for firmly position and secure the workpieces, the heat effected joining of the exposed portions can commence. The joined parts are then allowed to cool and removed from the holding mixture and the mixture may be remolded for the insertion of other workpieces to be positioned and joined.

If identical workpieces are to be joined on a continuous basis, the mixture can be hardened by the application of heat after the cavities for receiving the workpieces have been formed by the insertion and removal of said workpieces. The hardened mixture is then usable for a permanent fixture for soldering, brazing or welding.

Having in mind the above and other objects that would be obvious from an understanding of the disclosure, the present invention comprises a method of combining and arranging parts illustrated in the presently preferred embodiments of the invention which are hereinafter set forth in sufficient detail to enable those persons skilled in the art to clearly understand the function, operation, construction and the advantages of it when read in conjunction with the accompanying drawing.

BRIEF DESCRIPTION OF THE DRAWING

The invention will be described in detail by way of example with reference to the following drawing in which:

FIG. 1 is a pictorial view illustrating the step of depositing the work holding material;

FIG. 2 is a pictorial view illustrating the workpieces inserted into the work holding material;

FIG. 3 is a pictorial view illustrating the workpieces positioned for joining;

FIG. 4 is a pictorial view illustrating the workpieces being joined; and

FIG. 5 is a pictorial view illustrating the workpieces separated from the work holding material.

DETAILED DESCRIPTION OF THE INVENTION

Referring to FIGS. 1-5 of the drawing and in accordance with the principles of the invention, a method for fixturing two or more workpieces 10, 12 for heat effected joining is shown. Initially, a quantity of work holding material 14 is deposited on a convenient work surface 16 for dispensing same from a syringe-like device 18, a squeeze tube or from a suitable container. The work holding material 14 comprises a moldable, heat resistant material which can conform to intricate shapes and will be further defined in detail.

First portions 20, 22 of the workpieces 10, 12 are inserted into the work holding material 14 leaving second portions 24, 26 exposed for heating by use of a torch 17 or other device. The second portions 24, 26 can also be partially inserted within the workpiece holding material 14 to effect complete joining. Solder or brazing metal 9, when applied and melted at the exposed portions 24, 26, flows along the joining seams 11 of the heated workpieces 10, 12 and continues into the holding material 14. The holding material 14 acts to withstand, retain and reflect heat keeping the solder or braze at its proper joining temperature. Preforms of solder or braze can also be utilized and the workpieces heated by torch or in an oven. The workpieces 10, 12 are fixed in the desired positional relationship with respect to one another and the work holding material 14 is simultaneously or afterwards manipulated to conform to the contours of the inserted portions 20, 22. The workpieces 10, 12 are now secure in the fixture created by the manipulated work holding material 14 and can be joined immediately while the holding material 14 remains pliable or alternatively the workpieces 10, 12 can be removed leaving cavity 15 having the same shape as the first portions 20, 22 and the fixture hardened to form a permanent and reusable work holder.

The work holding material 14 is made by mixing together a ceramic fiber, an inorganic binder and a thickening agent. A formulation that produces excellent results and is preferred comprises 30-40 lbs. of ceramic alumina silica fiber selected from the many available commercial fibers with approximately a 50% $Al_2O_3$ - 50% $SiO_2$, with fibers lengths up to 50 to 75 mm. The binder is selected from the many available commercial silicates and 60-70 lbs. of DuPont Ludox HS 30 is used. The binder is mixed with a thickening agent selected from the many available commercial resins that are comparable with the Ludox HS 30.

Approximately 2 lbs. of Polyox WSR 301, a product of Union Carbide, is acceptable for this mixture. The Polyox is thoroughly dispersed froming a thick pasty liquor to which the ceramic fiber is added. Mixing is continued for approximately 1-8 hours until a thick, sticky paste is developed. This composition can withstand temperatures up to 1780° C., is non-corrosive and inert to solders, brazes and fluxes.

Any solid particulate or fiber material may be substituted for the ceramic fiber, including high temperature plastics, glass and metal fibers or mixes of particulate solids which provide low shrinkage upon drying. Other silicates, inorganic or heat resistant binders are used where permanent hard products are desired, or organic binders when a temporary bond is desired.

Organic or inorganic thickening agents or gelling agents may be used in place of the Polyox as long as the resultant material will dry with negligible shrinkage and be inert to the conditions encountered during soldering, brazing or welding.

In forming a hardened fixture, the formed mixture is heated to 120° C. and held at that temperature for from 1-3 hours.

While preferred and other exemplary embodiments of the invention are illustrated and/or described, it will be understood that the invention is in no way limited to these embodiments.

What is claimed is:

1. A method for fixturing two or more workpieces in a desired positional relationship to one another for the heat effected joining of same comprising in the following order the steps of:
   a. depositing a quantity of moldable, heat resistance workpiece holding material on a work surface;
   b. inserting portions of each of the workpieces to be joined into said holding material with portions thereof to be heated left exposed;
   c. moving the inserted workpieces to the desired positional relationship with one another by adjusting the relative positions of the workpieces; and
   d. manipulating said holding material for conformance to the contours of the inserted portions of the workpieces whereby said workpieces can be joined by heat effected means such as welding.

2. The method as recited in claim 1, wherein the step of fixing comprising simultaneously adjusting the position of the workpieces and manipulating the work holding material.

3. The method as recited in claim 1 or claim 2, further including the steps of removing the fixed workpieces from the holding material, hardening the holding material and reinserting the workpieces into the hardened holding material.

4. The method as recited in claim 3, wherein the step of hardening comprises heating the holding material to a temperature of approximately 120° C. and maintaining the holding material at said temperature for 1 to 3 hours.

5. The method as recited in claim 1, wherein the step of depositing comprises providing workpiece holding material capable of remaining dimensionally stable at elevated temperatures.

6. The method as recited in claim 5, wherein the workpiece holding material is provided by mixing a ceramic material, a binder and a thickening agent.

7. The method as recited in claim 6, wherein the step of mixing comprises providing alumina silica fibers having approximately 50% $Al_2O_3$ and 50% $SiO_2$, said fibers having a length of 5 to 7.5 cm. as the ceramic material.

8. The method as recited in claim 5 comprising providing a workpiece holding material mixture including a ceramic material, a binder and a thickening agent.

9. The method as recited in claim 8, wherein the mixture comprises providing alumina silica fibers having approximately 50% $Al_2O_3$ and 50% $SiO_2$, said fibers having a length of 5 to 7.5 cm. as the ceramic material.

10. A method for fixturing two or more workpieces in a desired positional relationship to one another for the heat effected joining of some comprising in the following order the steps of:
    a. depositing a quantity of moldable, heat resistant workpiece holding material on a work surface by discharging the holding material from a syringelike device;
    b. inserting portions of each of the workpieces to be joined into the holding material with portions thereof to be heated left exposed
    c. moving the inserted workpieces to the desired positional relationship with one another by adjusting the relative positions of the workpieces; and
    d. manipulating the holding material for conformance to the contours of the inserted portions of the workpieces whereby said workpieces can be joined by heat effected means such as welding.

* * * * *